REMOVAL OF SULFUR FROM GASOLINE

REMOVAL OF SULFUR FROM GASOLINE

INVENTORS.
NORMAN L. CARR
HARRY C. STAUFFER

OPERATION OF ADSORPTION SYSTEMS

Norman L. Carr, Allison Park, and Harry C. Stauffer, Cheswick, Pa., assignors to Gulf Research & Development Company, Pittsburgh, Pa.
Filed Nov. 7, 1969, Ser. No. 874,924
Int. Cl. C10g 17/08; B01d 53/04
U.S. Cl. 208—208
19 Claims

ABSTRACT OF THE DISCLOSURE

The operation of an adsorption system for the removal of at least one component from a fluid material with a porous adsorbent is improved by interrupting flow of the fluid feed over the porous adsorbent at the time or before the concentration in the effluent of component material to be removed or the concentration of component material on the adsorbent reaches a predetermined value, and subsequently restarting the flow of fluid feed over the adsorbent.

BACKGROUND OF THE INVENTION

This invention relates to a novel method of operating an adsorption system whereby the capacity of the system is increased. The adsorption system employs a fixed bed porous adsorbent which selectively adsorbs at least one component from a fluid material. The fluid material can be contaminated with the components to be removed or it can contain a component which becomes more valuable when that component exists in a higher purity state or a combination of these conditions can exist.

The prior adsorption art, and for that matter the state of the processing art as a whole, has concerned itself with designing and operating systems on a completely continuous flow basis because continuous flow operation is generally more efficient and economical than intermittent operation. To the contrary, we have found that at least a partially intermittent or discontinuous method of operation produces superior results.

When an adsorption system is operated to remove contaminants from a fluid material normally the fluid material is passed continuously through a column containing a bed of adsorbent until some predetermined level of contaminant concentration in the column effluent is reached. This predetermined level of contaminant concentration is termed "break-through" and expressed as a fraction, the numerator being the concentration of contaminant in the effluent and the denominator consisting of the concentration of the contaminant in the feed to the column. Under conventional methods of operation, the column is operated until this break-through concentration in the effluent is reached and the column is then switched from an adsorption cycle to a desorption cycle and regenerated. The inherent weakness in the normal continuous method of operation is that the maximum theoretical utilization of the adsorbent cannot be achieved or even closely approached, therefore, the adsorbent bed and the adsorption column must be oversized to accomplish a desired cycling sequence. Therefore, a system operating on an entirely continuous basis does not fully realize its maximum potential.

In the conventional adsorption system after breakthrough is reached the adsorption column feed is shut off and a regeneration cycle is started or a fresh adsorbent is placed into the column. However, as we will point out in more detail later, the discontinuous operation of an adsorption column within the scope of our invention means the stopping and restarting of the feed material at or before the normal breakthrough concentration or predetermined value is reached and this stop-start action is initiated one or more times without reactivating or removing the adsorbent and before contamination of the effluent reaches an undesirably high level. It is preferred to operate in accordance with our invention by interrupting the flow of feed material considerably before the normal break-through concentration is reached.

SUMMARY OF THE INVENTION

In an adsorption process wherein a fluid feed containing components to be removed is passed over a porous adsorbent to selectively remove the components, and the flow of fluid feed over the adsorbent is interrupted and the adsorbent reactivated or the components removed from the feed are recovered when the concentration of the components in the effluent or on the adsorbent reaches a predetermined value, the improvement comprising interrupting flow of fluid feed over the adsorbent at or before the concentration of said components in the effluent or on the adsorbent reaches a predetermined value, and restarting the flow of fluid feed over the adsorbent after interruption after delaying the restarting of the fluid feed over the adsorbent for a time sufficient to allow the system to substantially equilibrate so that the adsorbent capacity is maximized. The steps of interrupting and restarting may be initiated one or more times.

DETAILED DESCRIPTION OF INVENTION

Figure 1:
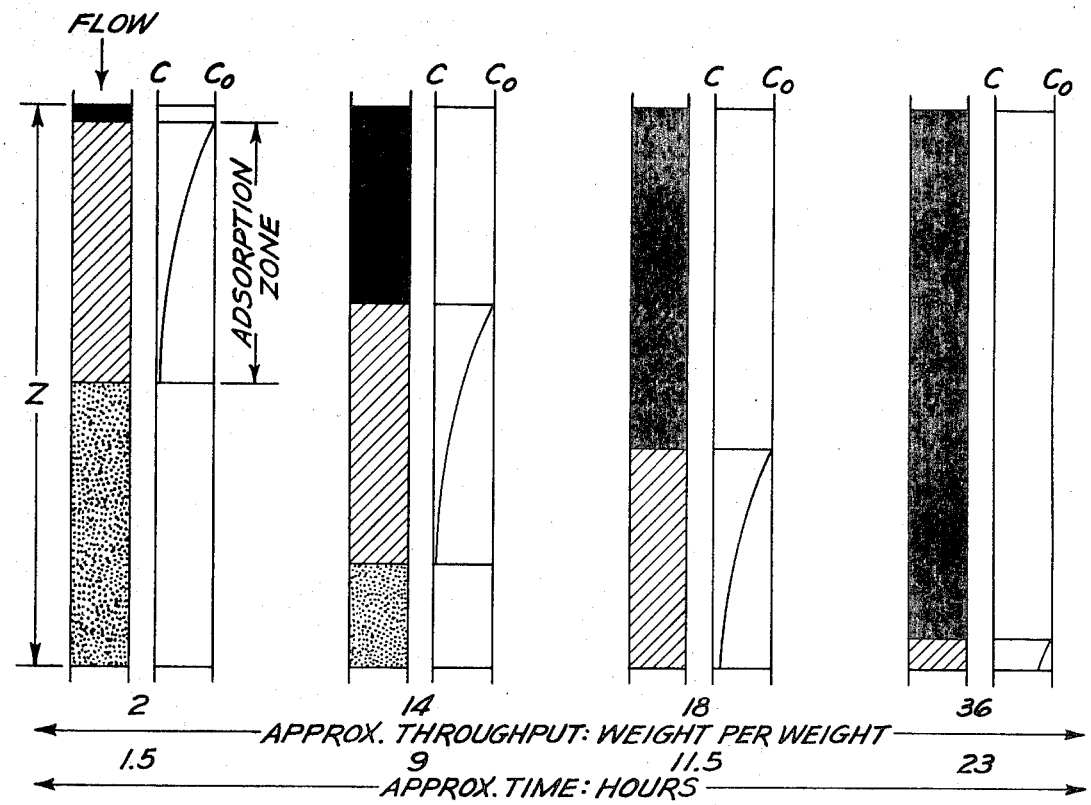
FIG. 1 is a representation of removal of sulfur from gasoline using a silica-alumina zeolite relating sulphur concentration in effluent and feed to adsorbent bed length, throughput and time.

Adsorption, as used herein, is defined as the taking up of a material or components at a surface or interface and is intended to also encompass the more specific term sorption wherein the interior of a porous or solid adsorbent is open to allow the taking up or invasion by a material or components. In other words, the adsorbent contains interstitial spaces. The adjective porous or solid before the word adsorbent is used herein to refer to the physical form of the adsorbent and distinguish this general type of adsorbent from others possessing a different physical form such as a liquid form.

When we speak of equilibration of the system, we mean specifically the achievement of a steady-state concentration of the solute in the fluid in the active adsorbent area. The active adsorbent area is cross-hatched area shown in FIG. 1. This change in concentration is depicted by the curved line in FIG. 1 connecting the concentration of the solute at the end of the cross-hatched area (C) and the concentration of solute in the feed ($C_0$) and is known as an adsorption wave front. Within this wave front area, the solute and the adsorbent reach a local equilibrium condition when the fluid flow is stopped.

The usefulness of this invention resides in the fact that by following the steps outlined by this method the adsorbent capacity to adsorb is maximized and thereby existing systems can be made more efficient and new systems can be made smaller. The conventional mode of operation as described in the section "Background of the Invention" is normally continuous flow until a predetermined level of contaminant concentration termed "breakthrough" is reached. This predetermined value is usually dictated by product quality specifications, such as maximum contaminant level set by industry standards, by downstream processing requirements, by economic considerations with respect to a given system, by the quantity of a component in a particular stream when it is desired to recover that component, and by various other factors. In the continuous system after the predetermined value is reached the system is usually regenerated or reactivated.

We have found that for maximum utilization of the adsorbent, it should not be regenerated at the time the predetermined value is reached, but that the flow should be interrupted at or before reaching this predetermined value and the flow restarted. The flow must be interrupted at least once and it is believed not more than about 10 times to realize maximum benefit. A range of about 1 to about 4 interruptions is preferred. In addition to the foregoing finite number of interruptions a more generalized indication of the number of interruptions can be determined by using the following equations. The equations can also be used to determine the point in the adsorption cycle at which interruption of the flow should occur. The first equation is a relationship quantifying the maximum theoretical throughput ($T_{max}$) i.e., the maximum total throughput of a system without adsorbent regeneration at given temperature, pressure and static equilibrium. The equation is:

$$T_{max} = K/X_0$$

where K is the well-known static equilibrium constant and may be obtained for any system at a given temperature and pressure by methods generally accepted in the art such as described in Branauer S., The Adsorption of Gases and Vapors, Princeton University Press, Princeton, N.J., 1945, chapter III, pp. 37–41; and $X_0$ is the concentration of solute in the feed. The second equation is:

$$O_{max} = \frac{V}{Z}\left(\frac{K}{\epsilon} + 1\right)$$

where $O_{max}$ is the maximum operating time of a system at given temperature, pressure and static equilibrium, Z is the adsorbent bed length, V is the interstitial linear velocity or the well-known superficial velocity for an open tube divided by the void volume of the bed, and $\epsilon$ is the fractional voids for the adsorbent bed. Either of these equations can be used to determine the maximum utilization of an adsorbent and once knowing this maximum utilization normal experimental runs for any system can be made by interrupting the flow of feed at various equal or unequal intervals of either maximum throughput or maximum time such as at $1/6$, $1/3$, $1/2$, $2/3$, $5/6$ (5 equal intervals) of the maximum or at $1/4$, $1/3$, $1/2$, $3/4$ (4 unequal intervals), etc. By making these experimental runs generalized plots for any system can be constructed by plotting the number of interruptions and interruption spacing versus utilization of the adsorbent. The function of interruption spacing and the number of interruptions will become asymptotic to the maximum utilization (i.e., either maximum theoretical throughput or maximum theoretical time), therefore, the plot will readily reveal the most beneficial combination of interruption spacing and number of interruptions.

It is believed the step of interrupting allows the system to at least partially or, preferably, to substantially equilibrate and thereby achieve distribution of the solute within the interstitial spaces of the adsorbent to an extent that cannot be achieved in the continuous dynamic flowing system. This time interval between interruption and restarting, necessary to realize the equilibrium described above, varies from system to system and can be determined experimentally by measuring the weight of solute adsorbed per unit length of time. The proper time interval before restarting flow is then chosen at that time between zero time and the time at which the rate of adsorption begins to level off. That is to say when the moles of solute per gram of adsorbent is plotted versus the time of contact with the adsorbent, the function of moles/grams increases more rapidly in the first few increments of time creating an exponential type relationship and as time elapses the relationship becomes one of a more linear character. Thus a person of ordinary skill in the art can readily pick the proper time interval for the system involved. By a substantial equilibration we mean that the time elapsed would allow the wave front to reach between about 50 and 99 percent of the maximum equilibration. A partial equilibration would be something less than substantial and would be in the range of about 50 to 70 percent of maximum equilibration. An intermediate range of equilibration would be from about 60 to 80 percent of the maximum. In the normal case about one to about 30 minutes is a satisfactory interval and a preferred interval is about 2 to about 10 minutes. As a general rule the higher molecular weight solutes require longer time periods of interruption. Also, sorbents having a low $D/r^2$ time constant will require longer times for proper sharpening of the adsorption wave front. D is the pore diffusivity, and r is the average pore radius. The units of $(D/r^2)$ is (time)$^{-1}$.

It should be emphasized at this point that the overall capacity of the system is increased even though the flow is completely interrupted for an insufficient time interval to achieve complete equilibration because of the beneficial effects of allowing any equilibration to occur and further because surprisingly this beneficial effect once it occurs is not immediately lost when the flow to the system is restarted.

When the singular term solute or component to be removed has been used herein it has been for convenience only and does not mean to imply that the subject invention is limited to removal of a single solute or component for the invention is equally applicable to multi-component systems.

In the following examples, a commercial silica-alumina zeolite having a trade name of 13X molecular sieve was used as the adsorbent. Other adsorbents such as silica gel, alumina, activated carbon and the like could be used for sulfur removal. The 13X designates the approximate pore diameter of the adsorbent in anstroms and a range of 5X to 13X could be used for sulfur removal. The feed material used in these experiments was a de-ethanized natural gasoline, a product produced from the recovery of natural gas. However, the subject invention is in no way limited to sulfur removal from natural gasoline for the invention is equally applicable to the separation of normal paraffins from iso-paraffins or naphtha using an appropriate porous adsorbent, such as 5 A. zeolites, Linde molecular sieves; the recovery of aromatics from paraffin stock employing an adsorbent, such as silica gel or removing water from gases with a desiccant, such as molecular sieves (4A, 5A, 13X), activated alumina, and silica gel; or other like fixed bed adsorbent processes.

The general operating information for the following examples is tabulated in Table 1 below:

TABLE 1

Sulfur removal from gasoline

Feed (gasoline)—
    Specific gravity: 60°/60° F. _____ 0.5938.
    Sulfur: p.p.m. _____ 880.
Adsorbent (13X molecular sieve)—
    Type _____ Extrudates.
    Diameter: in. _____ 1/8.
    Weight: lb. _____ 3.15.
Bed—
    Length: ft. _____ 3.38.
    Diameter: in. _____ 2.07.
Operation—
    Pressure: p.s.i.g. _____ 350.
    Temperature: ° F. _____ 100.
    Flow:
        Direction _____ Down.
        Rate: lb./hr. _____ 4.94.
        LHSV _____ 1.7.

EXAMPLE I

Operating until reaching predetermined level and then reactivating adsorbent

Prior to starting any run on fresh adsorbent, the bed of adsorbent is activated by purging with dry nitrogen at a rate of 5 s.c.f. per hour and a temperature of about 650° F. A purging period of 2 to 4 hours is normally adequate. The bed is then cooled to run temperature with a continuing flow of dry nitrogen. When run temperature is reached, operating pressure is established with the nitrogen and the flow of the purge nitrogen is stopped.

The feed, preheated to run temperature, is introduced into the top of the adsorbent bed at the desired flow rate. The desired flow rate is then maintained for the duration of the run. When effluent first emerges from the bottom of the bed, it will be free of any sulfur-containing compounds. Samples of this effluent are analyzed periodically to detect initial break-through of the sulfur compounds and to monitor their increasing concentration with time. When the concentration of these compounds reaches a predetermined value set by product specification, the feed is stopped. The bed is then reactivated by purging entrained liquid from the bed with nitrogen.

At the operating conditions outlined in Table 1, the concentration profile relating the sulfur in the effluent (C) to that in the feed ($C_0$) is rapidly developed at the inlet of the bed and is unique for these conditions. The movement of this profile through the bed as a function of time and/or throughput of total feed is illustrated in FIG. 1. The condition of the adsorbent in the column is illustrated in FIG. 1 by the dark shaded area representing completely saturated adsorbent, the cross-hatched area representing partially saturated adsorbent and the dotted area representing substantially sulfur-free adsorbent. The concentration profile is illustrated in FIG. 1 by the curved line connecting the sulfur content in the effluent (C) to that in the feed ($C_0$).

Figure 2:
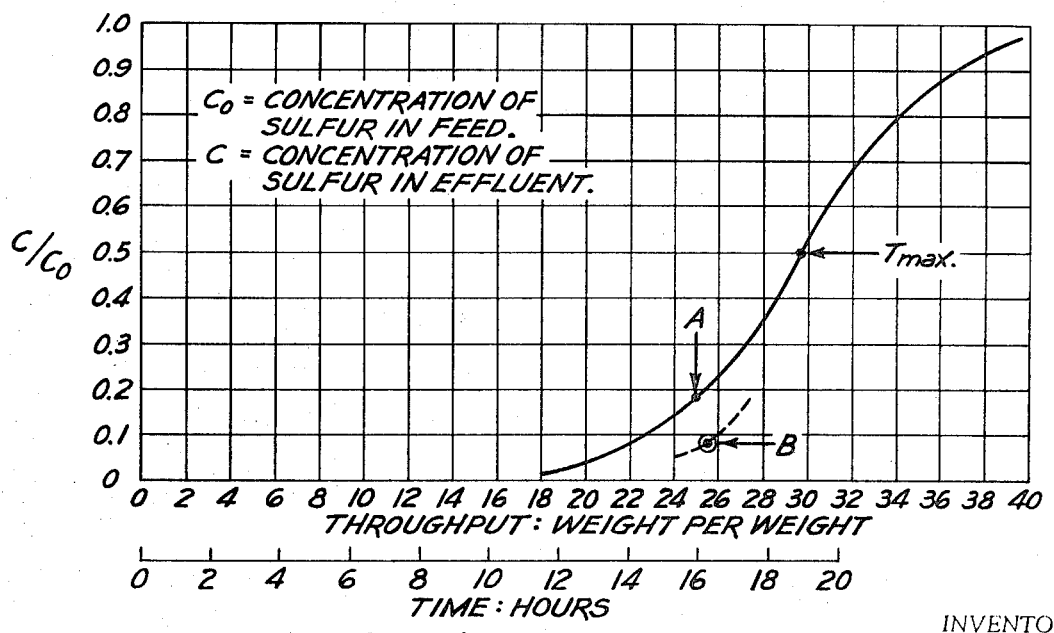
FIG. 2 is a graphical representation of removal of sulfur from gasoline using a silica-alumina zeolite relating sulfur concentration in effluent and feed to throughput and time.

At a throughput of 23.5 weight of feed per weight of adsorbent, the sulfur content of the effluent reached 100 p.p.m. and at a throughput of 25 weight per weight, the sulfur concentration was 160 p.p.m. The 160 p.p.m. point was the predetermined limiting value required by product specification. Experimental data correlated to generalized design plots as found in Rosen, J. B., Ind. Eng. Chem., 46, 1590 (1954) indicates that initial breakthrough of sulfur compounds in the effluent occurred at about 17.5 weight per weight throughput. From the foregoing information, a concentration profile at the bed exit was constructed as shown in FIG. 2, which illustrates the relationship of $C/C_0$ versus time and throughput. As pointed out above, the maximum throughput for the system using normal operating procedures is 25 weight per weight.

EXAMPLE 2

Interrupting operation at the predetermined value

If the adsorption process is only interrupted once and the adsorbent is not reactivated at the maximum throughput for normal operation (point A, FIG. 2) of 25 weight per weight for a period of 17 minutes, and then the feed is restarted at the initial feed rate, the sulfur concentration in the effluent drops from its previous value of 160 p.p.m. to an average of about 70 p.p.m. (point B, FIG. 2) after the feed has been restarted and the run continued for 18 minutes. The effluent sulfur concentration of 160 p.p.m. and 70 p.p.m. are represented in FIG. 2 at sulfur concentrations $C/C_0$ of 0.18 and 0.08 respectively. The effluent concentration of 160 p.p.m. is not reached again until 2½ weight per weight of throughput later and the corresponding operating time is increased about 1½ hours. To obtain an equivalent throughput increase of 2½ weight per weight without the 17 minute interruption, the bed length would have to be increased approximately 20 percent and obviously the increase of 1½ hours operating time is extremely large in comparison to the 17 minute interruption.

EXAMPLE 3

Interrupting operation before predetermined value

It is apparent from FIG. 1 that if the operation is not interrupted until the predetermined value has been reached as in Example 2, then the bottom portion of the bed or the final adsorption zone is essentially all that remains to improve the operation. Although a substantial benefit is obtained as illustrated in Example 2, by interrupting the operation at the time the predetermined value is reached and restarting 17 minutes later, considerably more benefit is realized if interruption is made soon after the start of the run.

If there were two interruptions of 15 minutes each, one before the predetermined value is reached (at 50% of maximum theoretical throughput) and one at the time the predetermined value is reached, throughput would be increased to about 29 weight per weight as compared to a throughput of 27.5 weight per weight as in Example 2 and the normal throughput of 25 weight per weight as in Example 1. The interruptions of 15 minutes each allow the system to at least partially equilibrate. Thus, Example 3 very nearly realizes the maximum theoretical throughput of 29.7 weight per weight and demonstrates a marked improvement over Example 2 and a still greater improvement over Example 1, realizing, of course, that as the maximum theoretical throughput is approached by finite increments, these finite increments are more difficult to achieve.

We claim:
1. In a method of operating an adsorption system wherein a fluid feed containing component material to be removed is passed over a porous adsorbent to selectively remove said component material and flow of fluid feed over the adsorbent is interrupted and the adsorbent is reactivated or discharged when the concentration of said component in the effluent reaches a predetermined value, the improvement comprising interrupting flow of fluid feed over said adsorbent at a first concentration of said component material in the effluent which concentration is below said predetermined value, delaying the restarting of the fluid feed over the adsorbent for a time sufficient to allow the system to at least partially equilibrate, restarting the flow of fluid feed over said adsorbent without reactivation at a second concentration of said component material in the effluent which is lower than said first concentration, and extending the life of said adsorption system without adsorbent reactivation to obtain a greater throughput of fluid feed while the concentration of said component material in the effluent is below said predetermined value than would be possible without said interruption.

2. A method of operating an adsorption system in accordance with claim 1 wherein the step of restarting the flow of fluid feed over said adsorbent after interruption is delayed for a period of time sufficient to allow the system to substantially equilibrate.

3. A method of operating an adsorption system in accordance with claim 1 wherein the step of restarting the flow of fluid feed over said adsorbent after interruption is delayed for a period of time sufficient to allow the system to reach about 99 percentage of maximum theoretical equilibration.

4. A method of operating an adsorption system in accordance with claim 2 wherein the period of time for the system to equilibrate is about 1 to about 30 minutes.

5. A method of operating an adsorption system in accordance with claim 1 wherein said steps of interrupting and restarting are initiated about 1 to about 10 times prior to reactivating or discharging said adsorbent.

6. A method of operating an adsorption system in accordance with claim 1 wherein said fluid feed is gasoline and said component material to be removed is sulfur containing compounds.

7. A method of operating an adsorption system in accordance with claim 1 including repeating said steps of interrupting and restarting a number of times sufficient to approach the maximum theoretical throughput, said maximum throughput being determined by the equation $$T_{max} = K/X_0$$

where
$T_{max}$ = maximum theoretical throughput,
$K$ = equilibrium constant, and
$X_0$ = concentration of components to be removed in the fluid feed.

8. A method of operating an adsorption system in accordance with claim 1 including repeating said steps of interrupting and restarting a number of times sufficient to approach the maximum theoretical operating time, said maximum operating time being determined by the equation $$O_{max} = \frac{Z}{V}\left(\frac{K}{\epsilon} + 1\right)$$

where
$O_{max}$ = maximum operating time,
$Z$ = adsorbent bed length,
$V$ = interstitial linear velocity,
$K$ = equilibrium constant, and
$\epsilon$ = fractional voids of the adsorbent bed.

9. In a method of operating an adsorption system wherein a fluid feed containing component material to be removed is passed over a porous adsorbent to selectively remove said component material and flow of fluid feed over the adsorbent is interrupted and the adsorbent reactivated or discharged when the concentration of said component in the effluent reaches a predetermined value, the improvement comprising interrupting flow of fluid feed over said adsorbent substantially when the concentration of said component in the effluent reaches said predetermined value, delaying the restarting of the fluid feed over the adsorbent for a time sufficient to allow the system to at least partially equilibrate, restarting the flow of fluid feed over said adsorbent without reactivation at a concentration of said component material in the effluent which is lower than said predetermined value, and extending the life of said adsorption system without adsorbent reactivation to obtain a greater throughput of fluid feed while the concentration of said component in the effluent is below said predetermined value than would be possible without said interruption.

10. A method of operating an adsorption system in accordance with claim 9 wherein the step of restarting the flow of fluid feed over the adsorbent after interruption is delayed for a period of time sufficient to allow the system to substantially equilibrate.

11. A method of operating an adsorption system in accordance with claim 10 wherein the period of time for the system to equilibrate is about 1 to about 30 minutes.

12. A method of operating an adsorption system in accordance with claim 9 wherein said fluid feed is gasoline and said component material to be removed is sulfur containing compounds.

13. In a method of operating an adsorption system wherein a fluid feed containing component material to be removed is passed over a porous adsorbent to selectively remove said component material and flow of fluid feed over the adsorbent is interrupted and the component material removed from the feed is recovered from the adsorbent when the concentration of said component material on the adsorbent reaches a predetermined value, the improvement comprising interrupting flow of fluid feed over said adsorbent at a first concentration of said component material on the adsorbent which concentration is below said predetermined value, delaying the restarting of the fluid feed over the adsorbent for a time sufficient to allow the system to at least partially equilibrate, restarting the flow of fluid feed over said adsorbent without reactivation at a second concentration of said component material in the effluent which is lower than said first concentration, and extending the life of said adsorption system without adsorbent reactivation to obtain a greater throughput of fluid feed while the concentration of said component material in the effluent is below said predetermined value than would be possible without said interruption.

14. A method of operating an adsorption system in accordance with claim 13 wherein the step of restarting the flow of fluid feed over said adsorbent after interruption is delayed for a period of time sufficient to allow the system to substantially equilibrate.

15. A method of operating an adsorption system in accordance with claim 14 wherein the step of restarting the flow of fluid feed over said adsorbent after interruption is delayed for a period of time sufficient to allow the system to reach about 99 percentage of maximum theoretical equilibration.

16. A method of operating an adsorption system in accordance with claim 14 wherein the period of time for the system to equilibrate is about 1 to about 30 minutes.

17. A method of operating an adsorption system in accordance with claim 13 wherein said steps of interrupting and restarting are initiated about 1 to about 10 times prior to reactivating said adsorbent.

18. A method of operating an adsorption system in accordance with claim 13 wherein said fluid feed is a gasoline and said component material to be removed is sulfur containing compounds.

19. In a method of operating an adsorption system wherein a gasoline feed containing sulfur compounds to be removed is passed over a porous adsorbent to selectively remove said sulfur compounds and flow of gasoline feed over the adsorbent is interrupted and the adsorbent is reactivated or discharged when the concentration of said sulfur compounds in the effluent reaches a predetermined value, the improvement comprising interrupting flow of said gasoline over said adsorbent at a first concentration of said sulfur components in the effluent which concentration is below said predetermined value, restarting the flow of said gasoline over the adsorbent after a delay of about 15 minutes without reactivation at a second concentration of said sulfur components in the effluent which is lower than said first concentration, interrupting the flow of gasoline over the adsorbent when the sulfur concentration in the effluent reaches said predetermined value, and restarting the flow of gasoline over the adsorbent after a delay of about 15 minutes without reactivation at a sulfur concentration in the effluent which is lower than said predetermined value, and extending the life of said adsorption system without adsorbent reactivation to obtain a greater throughput of fluid feed while the sulfur concentration is below said predetermined value than would be possible without said interruptions.

References Cited
UNITED STATES PATENTS

| 3,078,641 | 2/1963 | Milton | 55—75 |
| 3,468,103 | 9/1969 | Hergt | 55—387 |
| 3,486,303 | 12/1969 | Glass et al. | 55—162 |

REUBEN FRIEDMAN, Primary Examiner
C. N. HART, Assistant Examiner

U.S. Cl. X.R.
55—73, 74

PO-1050
(5/69)

UNITED STATES PATENT OFFICE
CERTIFICATE OF CORRECTION

Patent No. 3,630,890  Dated December 28, 1971

Inventor(s) Norman L. Carr and Harry C. Stauffer

It is certified that error appears in the above-identified patent and that said Letters Patent are hereby corrected as shown below:

COLUMN 3, SECOND EQUATION - DELETE $$" \; O_{max} = \frac{V}{Z} \left( \frac{K}{\epsilon} + 1 \right) \;"$$

AND INSERT $$-- \; O_{max} = \frac{Z}{V} \left( \frac{K}{\epsilon} + 1 \right) \; --.$$

Signed and sealed this 16th day of May 1972.

(SEAL)
Attest:

EDWARD M. FLETCHER, JR.
Attesting Officer

ROBERT GOTTSCHALK
Commissioner of Patents